United States Patent
Tiwari

(10) Patent No.: US 11,794,678 B2
(45) Date of Patent: Oct. 24, 2023

(54) SYSTEMS AND METHODS FOR ISOLATING COMPARTMENTS OF A VEHICLE

(71) Applicant: Toyota Motor Engineering & Manufacturing North America, Inc., Plano, TX (US)

(72) Inventor: Prashant Tiwari, Santa Clara, CA (US)

(73) Assignee: Toyota Motor Engineering & Manufacturing North America, Inc, Plano, TX (US)

( * ) Notice: Subject to any disclaimer, the term of this patent is extended or adjusted under 35 U.S.C. 154(b) by 266 days.

(21) Appl. No.: 17/155,436

(22) Filed: Jan. 22, 2021

(65) Prior Publication Data

US 2022/0185214 A1    Jun. 16, 2022

Related U.S. Application Data

(60) Provisional application No. 63/126,132, filed on Dec. 16, 2020.

(51) Int. Cl.

| | | |
|---|---|---|
| B60R 21/01 | (2006.01) | |
| B60R 21/08 | (2006.01) | |
| B60R 21/12 | (2006.01) | |
| B60R 21/232 | (2011.01) | |
| F16J 15/46 | (2006.01) | |

(Continued)

(52) U.S. Cl.
CPC ............. B60R 21/01 (2013.01); B60R 21/08 (2013.01); B60R 21/232 (2013.01); *B60R 16/037* (2013.01); *B60R 21/12* (2013.01); *B60R 2021/01231* (2013.01);

(Continued)

(58) Field of Classification Search
CPC ....... B60R 21/01; B60R 21/12; B60R 21/232; B60R 21/08
See application file for complete search history.

(56) References Cited

U.S. PATENT DOCUMENTS 3,931,994 A * 1/1976 Palmiter ............ B60H 1/00592
280/748
5,848,817 A * 12/1998 Niehaus ................ B60R 21/026
280/749

(Continued)

FOREIGN PATENT DOCUMENTS

| CN | 101808856 A * | 8/2010 | ........... B60R 21/207 |
| CN | 209290222 U | 8/2019 | |

(Continued)

OTHER PUBLICATIONS

Yaron Steinbuch, "Lyft driver crafts crude coronavirus containment compartment in car", New York Post, 1 page, Mar. 10, 2020.

(Continued)

*Primary Examiner* — Faye M Fleming
(74) *Attorney, Agent, or Firm* — Christopher G. Darrow; Darrow Mustafa PC

(57) ABSTRACT

System, methods, and other embodiments described herein relate to isolating a compartment. In one embodiment, a method includes isolating airflow to an occupant by actuation of a partition in response to a signal indicating a risk and the partition utilizes an inflatable bladder to seal an area of a compartment in a vehicle. The method also includes communicating a precaution associated with the actuation to occupants.

20 Claims, 5 Drawing Sheets

(51) Int. Cl.
  *B60R 16/037* (2006.01)
  *B60R 21/02* (2006.01)
(52) U.S. Cl.
  CPC .............. *B60R 2021/01286* (2013.01); *B60R 2021/0273* (2013.01); *F16J 15/46* (2013.01)

(56) References Cited

U.S. PATENT DOCUMENTS

| | | | |
|---|---|---|---|
| 6,086,128 | A | 7/2000 | Whitehead, Sr. |
| 8,272,674 | B2 * | 9/2012 | Vance ..................... B60N 2/91 296/24.46 |
| 10,875,488 | B2 * | 12/2020 | Kanegae ............. B60R 21/2338 |
| 11,097,680 | B2 * | 8/2021 | Jayakar ................ B60R 21/232 |
| 11,458,922 | B2 * | 10/2022 | Fischer ................ B60R 21/231 |

FOREIGN PATENT DOCUMENTS

| | | | | |
|---|---|---|---|---|
| DE | 102007026366 | A1 | 12/2008 | |
| DE | 102014000863 | A1 * | 8/2014 | ............ B60R 21/20 |
| FR | 2540053 | A1 | 8/1984 | |
| JP | 2005170172 | A | 6/2005 | |
| JP | 2019172035 | A * | 10/2019 | ....... B60R 21/01512 |
| NL | 2025440 | B1 * | 11/2021 | |

OTHER PUBLICATIONS

Unknown, "Safe transportation to and from quarantine and isolation spaces", Built for Zero, 8 pages, Apr. 14, 2020.

* cited by examiner

SYSTEMS AND METHODS FOR ISOLATING COMPARTMENTS OF A VEHICLE

CROSS-REFERENCE TO RELATED APPLICATIONS

This application claims benefit of U.S. Provisional Application No. 63/126,132, filed on, Dec. 16, 2020, which is herein incorporated by reference in its entirety.

TECHNICAL FIELD

The subject matter described herein relates, in general, to a system that isolates compartments of a vehicle, and, more particularly, to isolating occupants in a compartment according to risk.

BACKGROUND

A manufacturer may build vehicles with sensors to gather sensor data about an occupant. A system may use the sensor data to adapt automated driving modes, climate control, safety systems, and so on. For example, the system may provide comfort by controlling air temperature or quality (e.g. smoke) for an occupant. Concerning safety, a safety system may be unable to measure the health risk of a stranger and determine exposure risk to other occupants. For example, an operator may be at increased risk when interacting with strangers, particularly for ride-sharing services. If preemptive action is needed, certain safety systems may also lack adaptive controls or cabin systems to mitigate the risk to the operator or occupants.

Furthermore, health risks in a vehicle are impacted by climate control systems. A climate control system may circulate air carrying a biological hazard between occupants in a cabin. For example, a virus may originate from an occupant who may be asymptomatic or showing light symptoms. The virus may be a risk for other occupants in the vehicle depending on immune system and health profiles. Accordingly, a climate control system may need particular controls and purposeful hardware in a cabin to mitigate health risks to occupants.

SUMMARY

In one embodiment, example systems and methods relate to a manner of isolating occupants in a compartment of a vehicle. In various implementations, systems used in a cabin may be incapable or ineffective at physically isolating occupants for health or comfort according to risk. In particular, systems may be incapable of isolating occupants on demand or before exposure according to a sudden change in risk. Accordingly, systems encounter difficulties shielding occupants or operators in an open cabin to prevent the spread of biological hazards, nuisance noise, or discomfort. Therefore, in one embodiment, a system may assess a risk of an occupant(s) carrying a biological hazard in a vehicle using sensors. The system may use a partition system to isolate the occupant(s) according to risk. In particular, the vehicle may include non-intrusive sensors to measure occupant(s) vitals, mood, and proximate air quality to detect the biological hazard from a known dataset. A controller notifies the system when the risk satisfies criteria according to aggregated sensor data. In response, the system may isolate the occupant(s) through powered chambers using a partition(s) that physically protects other occupants. Gaskets at the bottom and inflatable bladders along the edges of the partitions may seal an area from the airflow in the cabin. The inflated bladder may occupy the space between the uppermost section of a partition and a ceiling of the vehicle interior. The chamber environmentally isolates an infected occupant(s) in a zone thereby protecting the health of other occupants.

Furthermore, the controller may request additional information from edge or cloud servers to factor the travel history of an occupant(s) for a risk assessment. In this way, the system may achieve contact tracing by determining if the occupant(s) recently traveled through a location with substantial exposure to a biological hazard. The system may isolate the occupant(s) to protect other occupants according to the determined risk and contact tracing information.

In one embodiment, a system for isolation of a compartment is disclosed. The system includes a memory communicably coupled to a processor. The memory stores an isolation module including instructions that when executed by the processor cause the processor to isolate airflow to an occupant by actuation of a partition in response to a signal indicating a risk and the partition utilizes an inflatable bladder to seal an area of a compartment in a vehicle. The memory also stores a communication module including instructions that when executed by the processor cause the processor to communicate a precaution associated with the actuation to occupants.

In one embodiment, a partition for a vehicle is disclosed. The partition includes an inflatable bladder to seal an area of a compartment in the vehicle in response to a signal received by a controller. The partition also includes a bottom-most section with a gasket of the partition to seal a floor of the vehicle.

In one embodiment, a method for isolating a compartment of a vehicle is disclosed. In one embodiment, the method includes isolating airflow to an occupant by actuation of a partition in response to a signal indicating a risk and the partition utilizes an inflatable bladder to seal an area of the compartment. The method also includes communicating a precaution associated with the actuation to occupants.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. In some embodiments, one element may be designed as multiple elements or multiple elements may be designed as one element. In some embodiments, an element shown as an internal component of another element may be implemented as an external component and vice versa. Furthermore, elements may not be drawn to scale.

DETAILED DESCRIPTION

Figure 1:
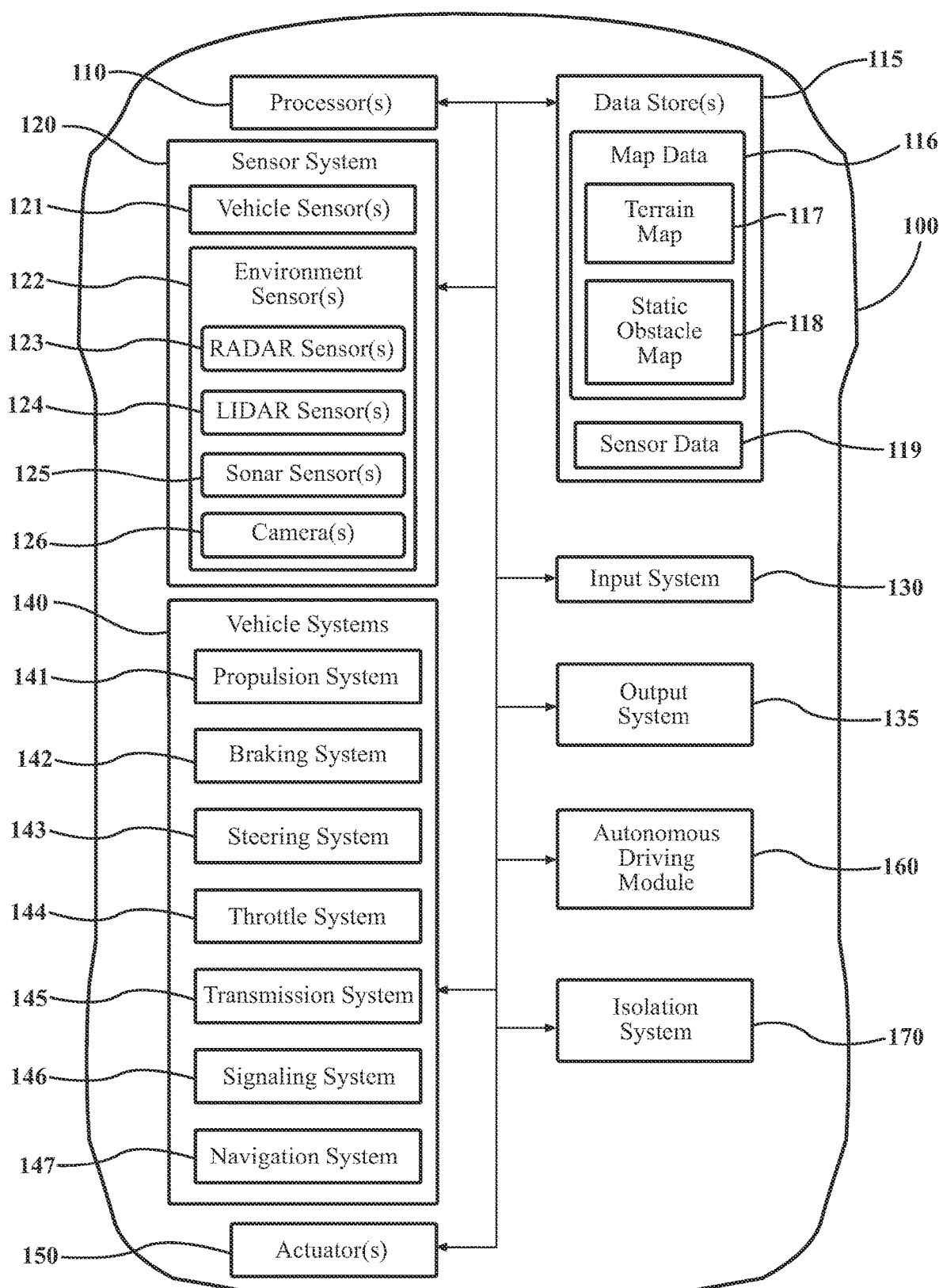
FIG. 1 illustrates one embodiment of a vehicle within which systems and methods disclosed herein may be implemented.

Systems, methods, and other embodiments associated with a manner of isolating occupants in a compartment of a vehicle are disclosed herein. A system may assess risk of an occupant(s) carrying a biological hazard in a vehicle using vitals and other sensors. The system may associate an occupant(s) infected with a communicable biological hazard as an elevated risk. In one arrangement, the system has powered chambers including partitions of a compartment that isolate the occupant(s) according to the risk. A partition(s) may be powered to actuate or egress using an electric motor. In one approach, the partition may be a substantially glass or plastic shield having foldable sections with sealed seams that actuate or egress per section. A partition that is substantially plastic may use an accordion structure to unfold, fold, or collapse. The system may retract the partition to store in a floor compartment or under a seat of a vehicle through a slot thereby allowing an open cabin configuration after risk mitigation.

The partition may include an inflatable bladder that inflates to seal edges or couplings from the airflow between partitions or cabin portions. The system may inflate the inflatable bladder using an air pump or compressed air. In one approach, the inflatable bladder may be a single use, replaceable unit using a chemical reaction for instant inflation. An inflated bladder may occupy the space between the uppermost section of a partition and a ceiling of the vehicle interior. The chamber environmentally isolates an infected occupant(s) in a zone thereby protecting the health of other occupants.

The system may actuate a partition of the chamber according to data aggregated from non-intrusive vitals sensors to measure an occupant(s) body temperature, pulse rate, or blood oxygen level. The system may compare the aggregated data to a known dataset of vectors, markers, or symptoms associated with a biological hazard or communicable disease and determine risk. The system may also use pressure and impact sensors data to determine anxiety or discomfort of an occupant(s) according to excessive shaking, jitteriness, fidgeting, agitation, and so on. For example, excessive pressure within a short time period may be an indicator of slamming and distress.

Furthermore, the system may request additional information from edge or cloud servers to factor an occupant(s) travel history for risk assessment. In this way, the system may achieve contact tracing by determining if the occupant recently traveled through a location with substantial exposure to a biological hazard. In one approach, the system may compare the determined risk to satisfy criteria before actuating a partition. The criteria may include parameters associated with vitals, mood, proximate air quality, travel history, and so on of the occupant(s). A parameter may also be associated with a minimum error rate associated with data. Thus, in various implementations the system reliably isolates an occupant(s) using partitions according to a risk assessment satisfying criteria related to health and travel data.

Referring to FIG. 1, an example of a vehicle 100 is illustrated. As used herein, a "vehicle" is any form of motorized transport. In one or more implementations, the vehicle 100 is an automobile. While arrangements will be described herein with respect to automobiles, it will be understood that embodiments are not limited to automobiles. In some implementations, the vehicle 100 may be any robotic device or form of motorized transport that benefits from the functionality discussed herein associated with isolating compartments of a vehicle.

The vehicle 100 also includes various elements. It will be understood that in various embodiments, the vehicle 100 may have less than the elements shown in FIG. 1. The vehicle 100 can have any combination of the various elements shown in FIG. 1. Further, the vehicle 100 can have additional elements to those shown in FIG. 1. In some arrangements, the vehicle 100 may be implemented without one or more of the elements shown in FIG. 1. While the various elements are shown as being located within the vehicle 100 in FIG. 1, it will be understood that one or more of these elements can be located external to the vehicle 100. Further, the elements shown may be physically separated by large distances.

Some of the possible elements of the vehicle 100 are shown in FIG. 1 and will be described along with subsequent figures. However, a description of many of the elements in FIG. 1 will be provided after the discussion of FIGS. 2-5 for purposes of brevity of this description. Additionally, it will be appreciated that for simplicity and clarity of illustration, where appropriate, reference numerals have been repeated among the different figures to indicate corresponding or analogous elements. In addition, the discussion outlines numerous specific details to provide a thorough understanding of the embodiments described herein. Those of skill in the art, however, will understand that the embodiments described herein may be practiced using various combinations of these elements. In either case, the vehicle 100 includes an isolation system 170 that is implemented to perform methods and other functions as disclosed herein relating to improving isolation of occupants in the vehicle 100. In one approach, functionality associated with at least one module of the isolation system 170 may be implemented within the vehicle 100 while further functionality is implemented within a cloud-based computing system.

Figure 2:
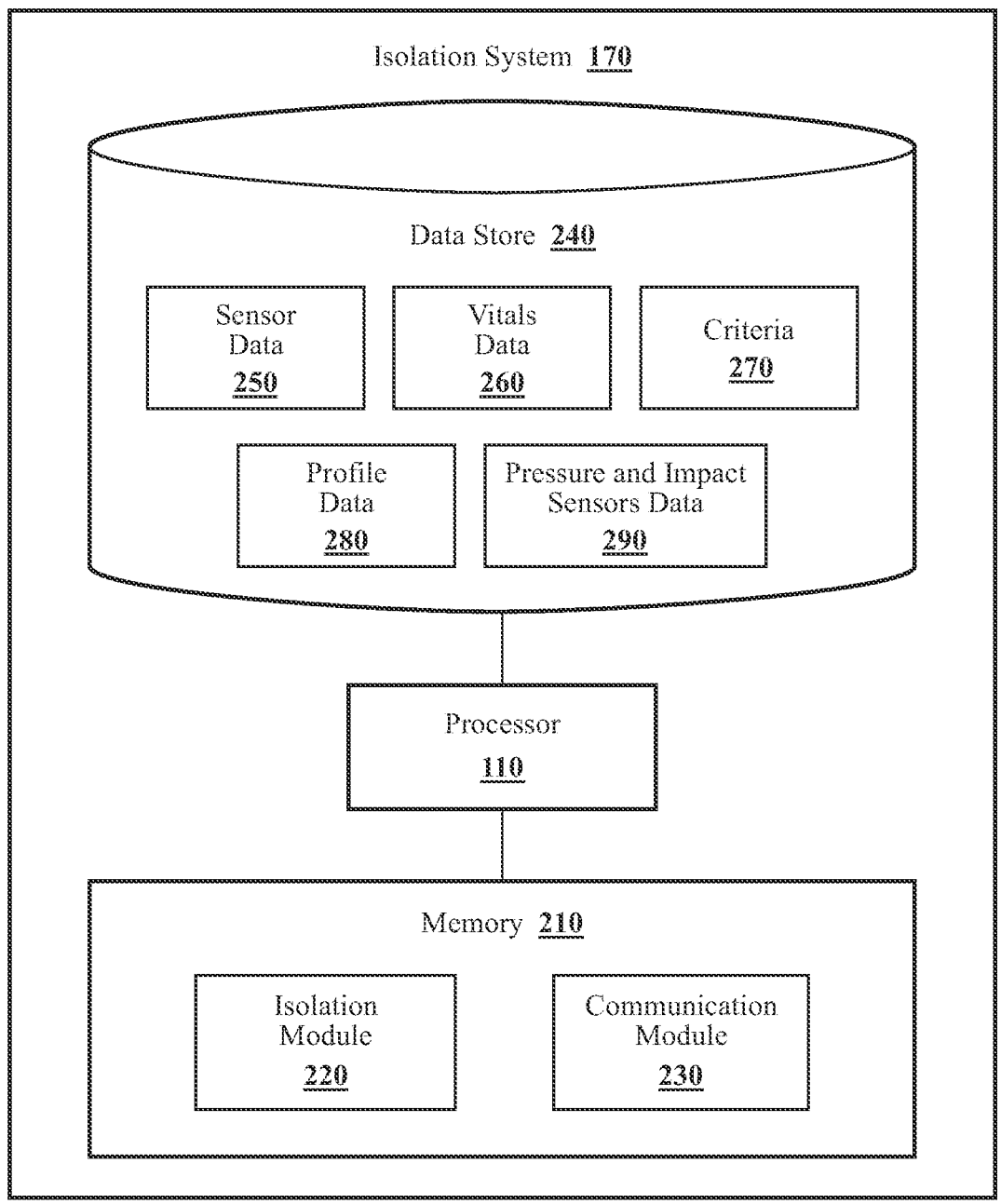
FIG. 2 illustrates one embodiment of the isolation system.

With reference to FIG. 2, one embodiment of the isolation system 170 is illustrated. The isolation system 170 is shown as including a processor 110 from the vehicle 100 of FIG. 1. Accordingly, the processor 110 may be a part of the isolation system 170, the isolation system 170 may include a separate processor from the processor 110 of the vehicle 100, or the isolation system 170 may access the processor 110 through a data bus or another communication path. In one embodiment, the isolation system 170 includes a memory 210 that stores an isolation module 220 and a communication module 230. The memory 210 is a random-access memory (RAM), read-only memory (ROM), a hard-disk drive, a flash memory, or other suitable memory for storing the modules 220 and 230. The modules 220 and 230 are, for example, computer-readable instructions that when executed by the processor 110 cause the processor 110 to perform the various functions disclosed herein.

The isolation system 170 as illustrated in FIG. 2 is generally an abstracted form of the isolation system 170 as may be implemented. The isolation module 220 generally includes instructions that function to control the processor 110 to receive data inputs from one or more sensors of the vehicle 100. Additionally, while the isolation module 220 is discussed as controlling the various sensors to acquire the sensor data 250, in one or more embodiments, the isolation module 220 can employ other techniques to acquire the sensor data 250 that are either active or passive. For example, the isolation module 220 may passively sniff the sensor data 250 from a stream of electronic information provided by the various sensors to further components within the vehicle 100. Moreover, the isolation module 220 can undertake various approaches to fuse data from multiple sensors when providing the sensor data 250 and/or from sensor data acquired over a wireless communication link.

Moreover, in one embodiment, the isolation system 170 includes a data store 240. In one embodiment, the data store 240 is a database. The database is, in one embodiment, an electronic data structure stored in the memory 210 or another data store and that is configured with routines that can be executed by the processor 110 for analyzing stored data, providing stored data, organizing stored data, and so on. Thus, in one embodiment, the data store 240 stores data used by the modules 220 and 230 in executing various functions. In one embodiment, the data store 240 includes the sensor data 250 along with, for example, metadata that characterize various aspects of the sensor data 250. In one embodiment, the data store 240 further includes the vitals data 260, the criteria 270, the profile data 280, and the pressure and impact sensors data 290. The vitals data 260 may include measured heart rate, temperature, blood pressure, blood oxygen levels, and so on of an occupant(s). The criteria 270 may include parameters associated with vitals, mood, proximate air quality, travel history, and so on of the occupant(s). A parameter may also be associated with a minimum error rate associated with data. In one approach, a criterion may be unsatisfied if a parameter is below the minimum error rate. The profile data 280 may be associated with immune, health, health records, social media, and so on related information. The pressure and impact sensors data 290 may be associated with observed abnormal movement, behavior, brake pressure, accelerator pressure, and so on of an occupant(s).

The isolation module 220, in one embodiment, is further configured to perform additional tasks beyond controlling the respective sensors to acquire and provide the sensor data 250. For example, the isolation module 220 includes instructions that cause the processor 110 to isolate airflow to an occupant(s) by actuation of a partition(s). As explained herein, the partition(s) may be powered to actuate, egress, or retract using an electric motor. An isolation system may trigger, in response to a signal indicating a risk, inflation of a bladder to seal edges or couplings between partitions or cabin portions from the airflow. The isolation module 220 may also assess if the risk satisfies the criteria 270 according to the sensor data 250 associated with any one of vitals, mood, and proximate air quality of the occupant(s). Furthermore, the isolation module 220 may detect a virus by comparison of the risk to a known dataset associated with an occupant(s) or update a profile of the occupant(s) for a subsequent assessment.

According to changes in risk or a risk level, the isolation module 220 may deflate the inflatable bladder to store the partition in the vehicle 100 when the risk does not satisfy the criteria 270. The isolation module 220 may also retract the partition per section and position in association with the location of a chamber. In one embodiment, the communication module 230 generally includes instructions that cause the processor 110 to communicate a precaution associated with the actuation of the inflatable bladder to occupants in the vehicle 100. The precaution may indicate a reason for the actuation and the risk or the risk level. In one approach, the communication module 230 may just indicate the precaution to the isolated occupant(s) to maintain privacy. The communication module 230 may also report, with or without consent, the precaution of an occupant(s) to local or national health authorities. Thus, the isolation system 170 may mitigate the risk of spreading a biological hazard by isolating an occupant(s) using a partition(s) with an inflatable bladder according to risk.

Figure 3:
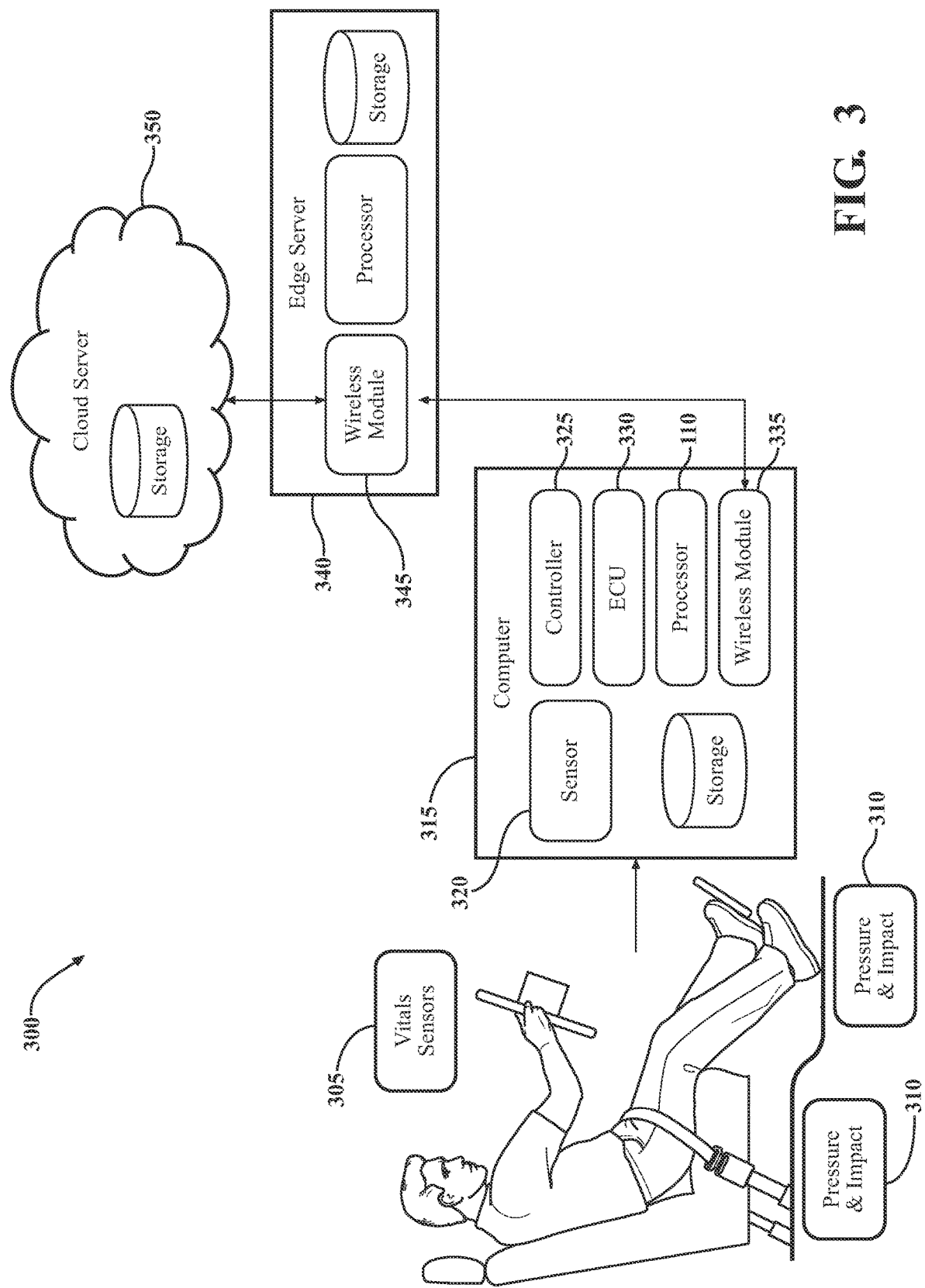
FIG. 3 illustrates one embodiment of an isolation system that is associated with isolating an occupant(s) in a compartment of a vehicle according to risk or a risk level.

Turning to FIG. 3, the figure illustrates one embodiment of an isolation system 300 that is associated with isolating an occupant(s) in a compartment of a vehicle according to risk or a risk level. In one approach, the isolation system 300 may use components, methods, or processes of isolation system 170. In the examples given herein, a chamber may include one or more compartments to isolate an occupant(s) to mitigate the spread of a biological hazard. The isolation system 300 may associate an occupant(s) infected with a communicable biological hazard as an elevated risk. A biological hazard may be a communicable disease, a communicable virus, a communicable chemical weapon, a communicable biological weapon, and so on. The isolation system 300 may include the vitals sensors 305 and the pressure and impact sensors 310 proximate to an operator. The vitals sensors 305 may be located on the steering wheel or door to non-intrusively collect vitals data 260 for the isolation system 300 to determine an occupant's health, mood, heart rate, pulse rate, temperature, and so on. For example, the vitals sensors 305 may use imaging or infrared light for contactless and non-intrusive measurement of an occupant(s) to determine an abnormal temperature, a fever, a high heart rate, a high pulse rate, blood oxygen levels, and so on.

Furthermore, the pressure and impact sensors 310 may be located in a seat, brake pedal, accelerator pedal, and so on. The isolation system 300 may use the pressure and impact sensors data 290 to determine abnormal movement, behavior, brake pressure, accelerator pressure, and so on of an occupant(s). For example, an occupant(s) or operator may be anxious when making regular and short movements on a seat. The isolation system 300 may also use the pressure and impact sensors data 290 to determine anxiety or discomfort of an occupant(s) according to excessive shaking, jitteriness, fidgeting, agitation, and so on. Concerning braking, excessive pressure within a short time period may be an indicator of slamming and distress. Uneven application of pressure on a pedal may also be an indicator of lethargy. In one approach, the isolation system may determine abnormal movement, behavior, and so on of an occupant(s) by making comparisons to profile data 280, such as social media information, of an occupant(s). For example, the isolation system 300 may reconcile sensor data 250 that indicates an elevated risk of infection with friends in a social media profile to trace the source of the disease.

A computer 315 in the vehicle 100 may acquire the vitals data 260 from the vitals sensors 305. In addition, the computer 315 may utilize a sensor controller 320 to acquire measured air quality information of a cabin or compartment of the vehicle 100 using humidity, biological, chemical, and so on sensors. The air quality measurements may identify environmental features of specific viruses from a known dataset. In one approach, the sensor controller 320 may be part of an isolation module that aggregates air quality information with the sensor data 250, the vitals data 260, the profile data 280, and the pressure and impact sensors data 290.

The controller 325 and/or electronic control unit (ECU) 330 may assess risk or a risk level by fusing or weighting information of an occupant(s) from the sensor controller 320. For example, the fused information of an occupant(s) may be compared to vectors, markers, or symptoms associated with a communicable disease, a communicable virus, a communicable chemical weapon, a communicable biological weapon, and so on. In one approach, the controller 325 may be part of an isolation module that acquires sensor data 250 at successive iterations or time steps. The controller 325 and/or ECU 330 may assess risk or a risk level using a machine learning model (ML) model, such as a convolutional neural network (CNN), trained according to an occupant(s) behavior or profile. The ML model may identify features from the sensor data 250, the vitals data 260, the profile data 280, and the pressure and impact sensors data 290 that the computer 315 uses to determine the risk of an occupant infected with a biological hazard. In one approach, certain tasks related to the assessment may be executed on the vehicle and others on the edge server 340, or the cloud server 350 to leverage extra computing resources.

An assessed risk or risk level may factor location data of an occupant(s). The sensor controller 320 may acquire remote data from the edge server 340 or the cloud server 350. The remote data may include past travel history or contact tracing indicating travel of an occupant(s) through a pandemic, severe communicable disease, or an elevated risk area. The contact tracing information may include information from health authorities, crowd-sourcing, social media, and so on. Communicable diseases may include cholera, hepatitis, influenza, malaria, measles, coronaviruses, COVID-19, tuberculosis, and so on that are transmissible by contact with infected individuals or their bodily discharges or fluids (such as respiratory droplets, blood, or semen), by contact with contaminated surfaces or objects, and so on. In one approach, the isolation system 300 may execute contact tracing using a graphical neural network (GNN) that identifies relations between map data and location-based services (LBS) information of an occupant(s). The computer 315 may request the remote data using wireless module 335 that communicates with the wireless module 345 of the edge server 340. The edge server 340 may request the remote data from the cloud server 350 if none is located for occupants of the vehicle 100.

If a risk or risk level of an occupant(s) satisfies criteria, the controller 325 signals the risk to the ECU 330. The risk may satisfy criteria according to sensor data associated with any one of vitals, mood, and proximate air quality of the occupant(s). The criteria may also include the travel of the occupant(s) through a location with incidences of a biological hazard according to information received from the edge server 340 or the cloud server 350. According to the signal, the ECU 330 may isolate an occupant(s) and airflow to the occupant(s) by actuation of a partition. As explained below, the partition may be powered to actuate, egress, or retract using an electric motor. In one approach, the partition may be a substantially glass or plastic shield having foldable sections with sealed seams that actuate, egress, or retract per section. The substantially glass or plastic shield may be clear, partially opaque, or substantially opaque for privacy. A partition that is substantially plastic may use an accordion structure to unfold, fold, or collapse. The isolation system 300 may retract the partition to store in a floor compartment or under a seat of vehicle 100 through a slot thereby allowing an open cabin configuration. The partition may include an inflatable bladder that inflates to seal edges or couplings from the airflow between partitions or cabin portions. For example, the partition may include an inflatable bladder that inflates to seal the space between an uppermost section of the partition and a ceiling of the vehicle 100.

Figure 4:
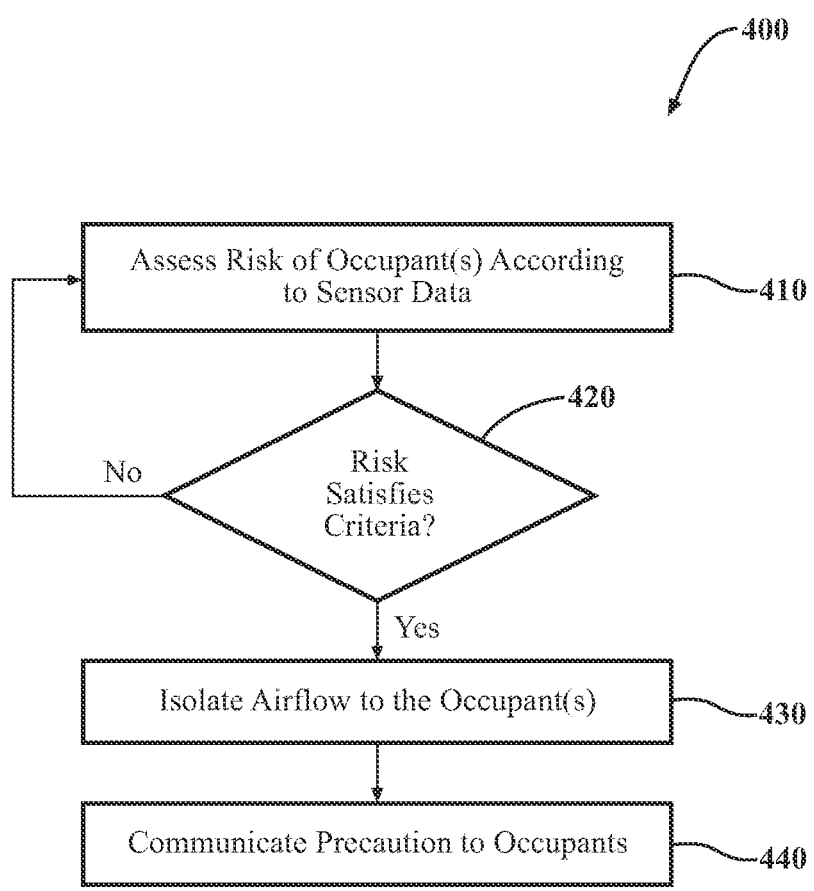
FIG. 4 illustrates one embodiment of a method that is associated with isolating an occupant(s) in a compartment of a vehicle according to risk or a risk level.

Turning to FIG. 4, a method is associated with isolating an occupant(s) in a compartment of a vehicle according to risk or a risk level. In method 400, an isolation system substantially operating in the vehicle 100 uses partitions to automatically isolate an occupant(s) for safety according to risk or a risk level of infection associated with a biological hazard. For example, the vehicle 100 intelligently isolating and controlling airflow around an occupant(s) using the isolation system 170 may mitigate the spread of communicable diseases thereby improving public health. One or more partitions may be powered to actuate, egress, or retract using an electric motor to automatically create separate compartments around an occupant(s) in the cabin as needed. The partition may include an inflatable bladder that inflates to seal edges or couplings between partitions or cabin portions from the airflow. In one approach, the partition may utilize an inflatable bladder that inflates to seal the space between an uppermost section of the partition and a ceiling of the vehicle 100. The isolation system may use sensor data or vitals data to determine the risk of an occupant(s) spreading a biological hazard.

At 410, the isolation system assesses the risk or the risk level of an occupant(s) according to the sensor data 250. The isolation system may associate an occupant(s) infected with a communicable biological hazard as an elevated risk. The isolation system may assess the risk or the risk level by aggregating, fusing, or weighting information from the sensor data 250. As mentioned above, the isolation system may also use the vitals data 260, the profile data 280, and the pressure and impact sensors data 290 to assess risk associated with an occupant(s). For example, the aggregated or fused information of an occupant(s) may be compared to vectors, markers, or symptoms associated with a communicable disease, a communicable virus, a communicable chemical weapon, a communicable biological weapon, and so on. The isolation system may also assess risk or a risk level using an ML model, such as a CNN, trained according to an occupant(s) behavior or profile. The ML model may identify features from the sensor data 250, the vitals data 260, the profile data 280, and the pressure and impact sensors data 290 that an isolation system uses to determine the risk of an occupant(s) infecting others with a biological hazard.

Furthermore, the isolation system may compare the pressure and impact sensors data 290 to an occupant(s) behavior or profile information to determine abnormal movement, brake pressure, accelerator pressure, and so on. For example, a particular occupant(s) may be anxious when making regular and short movements on a seat. The isolation system may also use the pressure and impact sensors data 290 to determine anxiety or discomfort of an occupant(s) according to excessive shaking, jitteriness, fidgeting, agitation, and so on. Concerning braking, excessive pressure within a short time period may be an indicator of slamming and distress. Uneven application of pressure may be an indicator of lethargy.

Certain tasks related to the assessment of risk may be executed on the vehicle and others on an edge server or a cloud server to leverage extra computing resources. As mentioned above, the isolation system may utilize location data of an occupant(s) to assess risk, including information acquired from the edge server or the cloud server. The information may include past travel history or contact tracing indicating travel of an occupant(s) through a pandemic, severe communicable disease, or an elevated risk area. Communicable diseases may include cholera, hepatitis, influenza, malaria, measles, coronaviruses, COVID-19, tuberculosis, and so on that are transmissible by contact with infected individuals or their bodily discharges or fluids (such as respiratory droplets, blood, or semen), by contact with contaminated surfaces or objects, and so on. As mentioned above, the isolation system may execute contact tracing using a GNN that identifies relations between map data and LBS information of an occupant(s).

At 420, the isolation system determines if the risk or the risk level of an occupant(s) having a biological hazard satisfies the criteria 270 to actuate isolation of an occupant(s). The risk or the risk level may satisfy the criteria 270 according to any one of vitals, mood, and proximate air quality of the occupant(s). Concerning mood, an occupant(s) may be anxious when making regular and short movements on a seat. The isolation system may also use the pressure and impact sensors data 290 to determine anxiety or discomfort of an occupant(s) according to excessive shaking, jitteriness, fidgeting, agitation, and so on. In one approach, the isolation system may use vitals sensors located on the steering wheel or door to collect vitals data 260 to determine an occupant's health, mood, heart rate, temperature, and so on. For example, the vitals sensors 305 may use infrared light for contactless and non-intrusive measurement of an occupant(s). The criteria 270 may also include the travel of the occupant(s) through a location with incidences of a biological hazard according to information received from the edge server or the cloud server.

At 430, if the risk or risk level satisfies the criteria 270 and there are other occupants, the isolation system isolates an occupant(s) using a partition(s). Otherwise, the isolation system further assesses the risk or the risk level of an occupant(s). As explained below, the partition may be powered to actuate, egress, or retract using an electric motor. In one approach, the partition may be a substantially glass or plastic shield having sections that actuate, egress, or retract. The isolation system may retract the partition to store in a floor compartment or under a seat of vehicle 100 thereby allowing an open cabin configuration. The partition may also utilize an inflatable bladder that inflates to seal the space between an uppermost section of the partition and a ceiling of the vehicle.

At 440, the isolation system communicates the precaution to occupants of the vehicle. The precaution may indicate a reason for the actuation and the risk or the risk level. In one approach, the isolation system may indicate the precaution to the isolated occupant(s) to maintain privacy. The isolation system may also report, with or without consent, the precaution of an occupant(s) to local or national health authorities.

Figure 5:
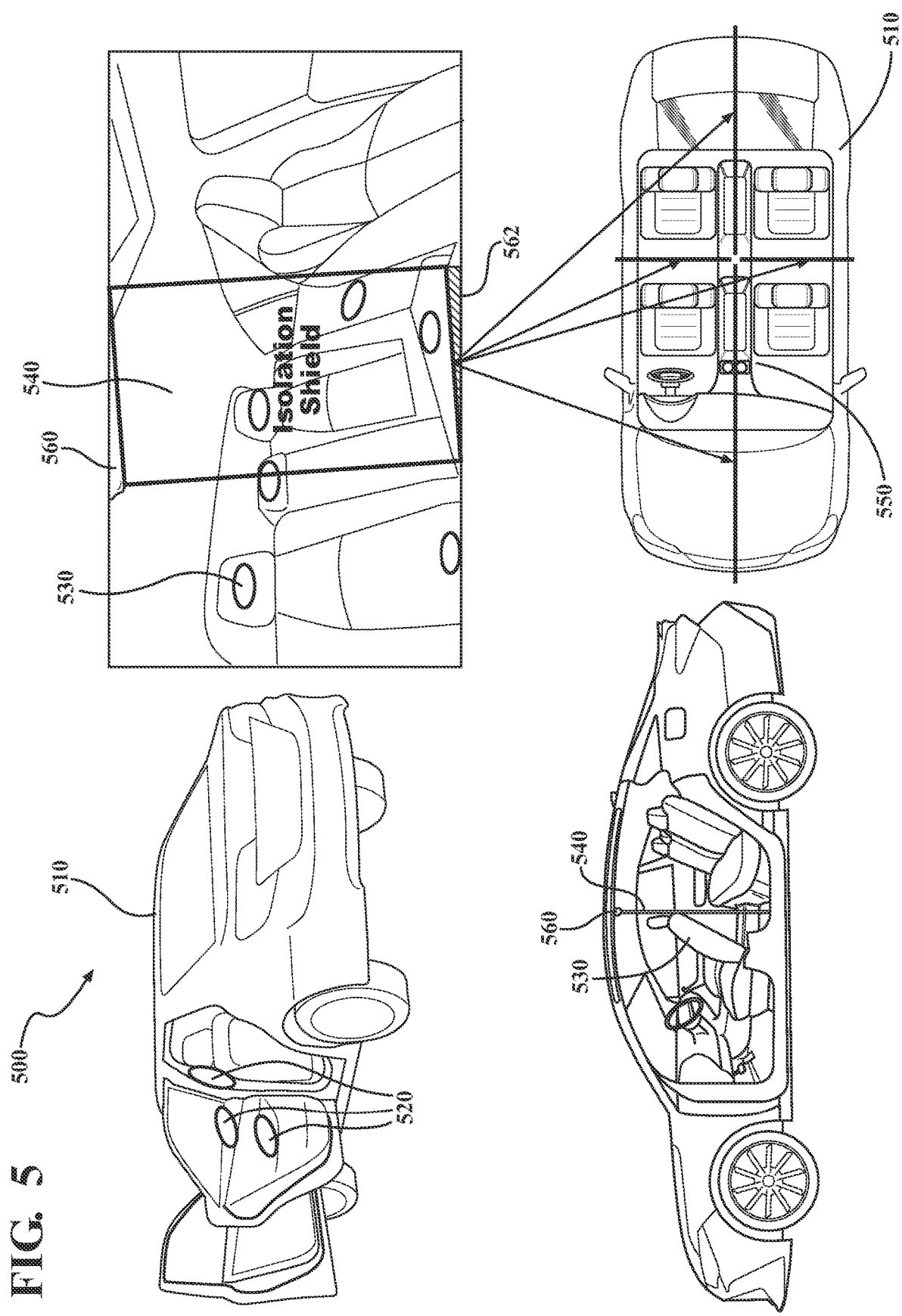
FIG. 5 illustrates one embodiment of a system to form compartments in a vehicle using partitions to isolate an occupant(s) according to risk or a risk level.

FIG. 5 illustrates one embodiment of a system 500 to form compartments in a vehicle 510 using partitions to isolate an occupant(s) according to risk or a risk level. The system 500 determines the risk or the risk level of an occupant(s) having a communicable disease according to data from the vitals sensors 520 and the pressure and impact sensors 530. The vehicle 510 may include the vitals sensors 520 on a door, a door panel, or a side panel. The vitals sensors 520 may collect vitals data 260 for the system 500 to determine an occupant's health, mood, heart rate, pulse rate, temperature, and so on. For example, the vitals sensors 520 may use imaging or infrared light for contactless and non-intrusive measurement of an occupant(s) to determine an abnormal temperature or fever, a high heart rate, a high pulse rate, and so on. The vehicle 510 may also include the pressure and impact sensors 530 in the seats or headrest for the system 500 to determine abnormal movement, behavior, brake pressure, accelerator pressure, and so on of an occupant(s) or operator.

The partition(s) 540 may be mounted or stored in the vehicle 510. In storable configurations, the system 500 may power the partition(s) 540 to actuate, egress, or retract using an electric motor. In one approach, the partition(s) 540 may be a substantially glass or plastic shield having foldable sections with sealed seams that actuate, egress, or retract per section. The substantially glass or plastic shield may be clear, partially opaque, or substantially opaque for privacy. The system 500 may retract the partition to store in a floor compartment or under a seat of the vehicle 510 through a slot thereby allowing an open cabin configuration. The edges of the partitions(s) 540 may have gaskets 562 extending there along to seal airflow when coupled or in contact with other partitions. The partition(s) 540 may include the inflatable bladder 560 that inflates to seal edges or couplings between partitions or cabin portions. For example, the partition(s) 540 may utilize the inflatable bladder 560 at the upper edges that inflates to seal the space between an uppermost section of the partition(s) 540 and a ceiling of the vehicle 510. The system 500 may inflate the inflatable bladder 560 using an air pump or compressed air. In one approach, the inflatable bladder 560 may be a single use, replaceable unit using a chemical reaction to inflate. A chemical reaction may provide instant inflation of the inflatable bladder 560 than an air pump in emergency situations.

The cabin of vehicle 510 may be separated in multiple zones 550 when the system 500 automatically actuates or activates the partition(s) 540 to shield occupants from infection. In a two-zone configuration, a partition may separate occupants in the front and back or passenger and driver side. For example, the partition(s) 540 may be on a track to slide or unfold to seal an occupant from potentially contaminated airflow. In a four-zone configuration, two or more partition(s) may isolate a seat in the vehicle 510.

In addition, the partition(s) 540 may comprise a projection portion(s) and use slots of the interior of the vehicle 510, such as the center console, dashboard, floor, ceiling, and rear passenger seats to egress, retract, and seal the edges of the partition(s) 540. In one approach, the partition(s) 540 may include gaskets 562 along the edges for insertion into associated ones of the vehicle interior slots. Slots may also be formed in the first partition for receiving one of the second and third projection portions. For example, the projection portion(s) of a first partition may be inserted into slots in the floor of the vehicle 510 so that the first partition extends along a width behind the front seats so that the system 500 separates sections of the front seats from the rear seats. The projection portion(s) of a second partition may be inserted into slots in the first partition and the center console so that the second partition extends from the front windshield to the first partition to separate an operator and front occupant seats. The projection portion(s) of a third partition may be inserted into slots on the first partition and the rear seats so that the third partition extends from the first partition to the rear windshield. In one approach, the second and third partition(s) may be inserted into associated slots of the first partition and the interior so that the edges of the second and third partitions above the first partition extend vertically.

After sealing the environment of an occupant(s) with an elevated risk of spreading a biological hazard, the system 500 may separate heating and cooling to an isolated zone from other zones. For example, a zone in the vehicle 510 may have an individually operable, positive-pressure climate control system. A zone may include an inlet vent for drawing air into the zone from an exterior of the vehicle 510. A zone may also have an associated outlet vent for exhausting air from the zone to the exterior of the vehicle 510. The system 500 may automatically open or close the inlet and outlet vents for a given zone when the zone is environmentally isolated to provide separate airflow to and from the affected zone.

FIG. 1 will now be discussed in full detail as an example environment within which the system and methods disclosed herein may operate. In some instances, the vehicle 100 is configured to switch selectively between different modes of operation/control according to the direction of one or more modules/systems of the vehicle 100. In one approach, the modes include: 0, no automation; 1, driver assistance; 2, partial automation; 3, conditional automation; 4, high automation; and 5, full automation. In one or more arrangements, the vehicle 100 can be configured to operate in a subset of possible modes.

In one or more embodiments, the vehicle 100 is an automated vehicle or autonomous vehicle. As used herein, "automated vehicle" or "autonomous vehicle" refers to a vehicle that is capable of operating in an autonomous mode (e.g., category 5, full automation). "Autonomous mode" refers to navigating and/or maneuvering the vehicle 100 along a travel route using one or more computing systems to control the vehicle 100 with minimal or no input from a human driver. In one or more embodiments, the vehicle 100 is highly automated or completely automated. In one embodiment, the vehicle 100 is configured with one or more semi-autonomous operational modes in which one or more computing systems perform a portion of the navigation and/or maneuvering of the vehicle along a travel route, and a vehicle operator (i.e., driver) provides inputs to the vehicle to perform a portion of the navigation and/or maneuvering of the vehicle 100 along a travel route.

The vehicle 100 can include one or more processors 110. In one or more arrangements, the processor(s) 110 can be a main processor of the vehicle 100. For instance, the processor(s) 110 can be an ECU, an application-specific integrated circuit (ASIC), a microprocessor, etc. The vehicle 100 can include one or more data stores 115 for storing one or more types of data. The data store 115 can include volatile and/or non-volatile memory. Examples of suitable data stores 115 include RAM, flash memory, ROM, Programmable Read-Only Memory (PROM), Erasable Programmable Read-Only Memory (EPROM), Electrically Erasable Programmable Read-Only Memory (EEPROM), registers, magnetic disks, optical disks, and hard drives. The data store 115 can be a component of the processor(s) 110, or the data store 115 can be operatively connected to the processor(s) 110 for use thereby. The term "operatively connected," as used throughout this description, can include direct or indirect connections, including connections without direct physical contact.

In one or more arrangements, the one or more data stores 115 can include map data 116. The map data 116 can include maps of one or more geographic areas. In some instances, the map data 116 can include information or data on roads, traffic control devices, road markings, structures, features, and/or landmarks in the one or more geographic areas. The map data 116 can be in any suitable form. In some instances, the map data 116 can include aerial views of an area. In some instances, the map data 116 can include ground views of an area, including 360-degree ground views. The map data 116 can include measurements, dimensions, distances, and/or information for one or more items included in the map data 116 and/or relative to other items included in the map data 116. The map data 116 can include a digital map with information about road geometry.

In one or more arrangements, the map data 116 can include one or more terrain maps 117. The terrain map(s) 117 can include information about the terrain, roads, surfaces, and/or other features of one or more geographic areas. The terrain map(s) 117 can include elevation data in the one or more geographic areas. The terrain map(s) 117 can define one or more ground surfaces, which can include paved roads, unpaved roads, land, and other things that define a ground surface.

In one or more arrangements, the map data 116 can include one or more static obstacle maps 118. The static obstacle map(s) 118 can include information about one or more static obstacles located within one or more geographic areas. A "static obstacle" is a physical object whose position does not change or substantially change over a period of time and/or whose size does not change or substantially change over a period of time. Examples of static obstacles can include trees, buildings, curbs, fences, railings, medians, utility poles, statues, monuments, signs, benches, furniture, mailboxes, large rocks, or hills. The static obstacles can be objects that extend above ground level. The one or more static obstacles included in the static obstacle map(s) 118 can have location data, size data, dimension data, material data, and/or other data associated with it. The static obstacle map(s) 118 can include measurements, dimensions, distances, and/or information for one or more static obstacles. The static obstacle map(s) 118 can be high quality and/or highly detailed. The static obstacle map(s) 118 can be updated to reflect changes within a mapped area.

The one or more data stores 115 can include sensor data 119. In this context, "sensor data" means any information about the sensors that the vehicle 100 is equipped with, including the capabilities and other information about such sensors. As will be explained below, the vehicle 100 can include the sensor system 120. The sensor data 119 can relate to one or more sensors of the sensor system 120. As an example, in one or more arrangements, the sensor data 119 can include information about one or more LIDAR sensors 124 of the sensor system 120.

In some instances, at least a portion of the map data 116 and/or the sensor data 119 can be located in one or more data stores 115 located onboard the vehicle 100. Alternatively, or in addition, at least a portion of the map data 116 and/or the sensor data 119 can be located in one or more data stores 115 that are located remotely from the vehicle 100.

As noted above, the vehicle 100 can include the sensor system 120. The sensor system 120 can include one or more sensors. "Sensor" means a device that can detect, and/or sense something. In at least one embodiment, the one or more sensors detect, and/or sense in real-time. As used herein, the term "real-time" means a level of processing responsiveness that a user or system senses as sufficiently immediate for a particular process or determination to be made, or that enables the processor to keep up with some external process.

In arrangements in which the sensor system 120 includes a plurality of sensors, the sensors may function independently or two or more of the sensors may function in combination. The sensor system 120 and/or the one or more sensors can be operatively connected to the processor(s) 110, the data store(s) 115, and/or another element of the vehicle 100. The sensor system 120 can produce observations about a portion of the environment of the vehicle 100 (e.g., nearby vehicles).

The sensor system 120 can include any suitable type of sensor. Various examples of different types of sensors will be described herein. However, it will be understood that the embodiments are not limited to the particular sensors described. The sensor system 120 can include one or more vehicle sensors 121. The vehicle sensor(s) 121 can detect information about the vehicle 100 itself. In one or more arrangements, the vehicle sensor(s) 121 can be configured to detect position and orientation changes of the vehicle 100, such as, for example, based on inertial acceleration. In one or more arrangements, the vehicle sensor(s) 121 can include one or more accelerometers, one or more gyroscopes, an inertial measurement unit (IMU), a dead-reckoning system, a global navigation satellite system (GNSS), a global positioning system (GPS), a navigation system 147, and/or other suitable sensors. The vehicle sensor(s) 121 can be configured to detect one or more characteristics of the vehicle 100 and/or a manner in which the vehicle 100 is operating. In one or more arrangements, the vehicle sensor(s) 121 can include a speedometer to determine a current speed of the vehicle 100.

Various examples of sensors of the sensor system 120 will be described herein. The example sensors may be part of the one or more environment sensors 122 and/or the one or more vehicle sensors 121. However, it will be understood that the embodiments are not limited to the particular sensors described.

As an example, in one or more arrangements, the sensor system 120 can include one or more of: radar sensors 123, LIDAR sensors 124, sonar sensors 125, weather sensors, haptic sensors, locational sensors, and/or one or more cameras 126. In one or more arrangements, the one or more cameras 126 can be high dynamic range (HDR) cameras, stereo or infrared (IR) cameras.

The vehicle 100 can include an input system 130. An "input system" includes components or arrangement or groups thereof that enable various entities to enter data into a machine. The input system 130 can receive an input from a vehicle occupant. The vehicle 100 can include an output system 135. An "output system" includes one or more components that facilitate presenting data to a vehicle occupant.

The vehicle 100 can include one or more vehicle systems 140. Various examples of the one or more vehicle systems 140 are shown in FIG. 1. However, the vehicle 100 can include more, fewer, or different vehicle systems. It should be appreciated that although particular vehicle systems are separately defined, any of the systems or portions thereof may be otherwise combined or segregated via hardware and/or software within the vehicle 100. The vehicle 100 can include a propulsion system 141, a braking system 142, a steering system 143, a throttle system 144, a transmission system 145, a signaling system 146, and/or a navigation system 147. These systems can include one or more devices, components, and/or a combination thereof, now known or later developed.

The navigation system 147 can include one or more devices, applications, and/or combinations thereof, now known or later developed, configured to determine the geographic location of the vehicle 100 and/or to determine a travel route for the vehicle 100. The navigation system 147 can include one or more mapping applications to determine a travel route for the vehicle 100. The navigation system 147 can include a global positioning system, a local positioning system or a geolocation system.

The processor(s) 110, the isolation system 170, and/or the autonomous driving module(s) 160 can be operatively connected to communicate with the various vehicle systems 140 and/or individual components thereof. For example, returning to FIG. 1, the processor(s) 110 and/or the autonomous driving module(s) 160 can be in communication to send and/or receive information from the various vehicle systems 140 to control the movement of the vehicle 100. The processor(s) 110, the isolation system 170, and/or the autonomous driving module(s) 160 may control some or all of the vehicle systems 140 and, thus, may be partially or fully autonomous as defined by the society of automotive engineers (SAE) levels 0 to 5.

The processor(s) 110, the isolation system 170, and/or the autonomous driving module(s) 160 can be operatively connected to communicate with the various vehicle systems 140 and/or individual components thereof. For example, returning to FIG. 1, the processor(s) 110, the isolation system 170, and/or the autonomous driving module(s) 160 can be in communication to send and/or receive information from the various vehicle systems 140 to control the movement of the vehicle 100. The processor(s) 110, the isolation system 170, and/or the autonomous driving module(s) 160 may control some or all of the vehicle systems 140.

The processor(s) 110, the isolation system 170, and/or the autonomous driving module(s) 160 may be operable to control the navigation and maneuvering of the vehicle 100 by controlling one or more of the vehicle systems 140 and/or components thereof. For instance, when operating in an autonomous mode, the processor(s) 110, the isolation system 170, and/or the autonomous driving module(s) 160 can control the direction and/or speed of the vehicle 100. The processor(s) 110, the isolation system 170, and/or the autonomous driving module(s) 160 can cause the vehicle 100 to accelerate, decelerate and/or change direction. As used herein, "cause" or "causing" means to make, force, compel, direct, command, instruct, and/or enable an event or action to occur or at least be in a state where such event or action may occur, either in a direct or indirect manner.

The vehicle 100 can include one or more actuators 150. The actuators 150 can be an element or a combination of elements operable to alter one or more of the vehicle systems 140 or components thereof responsive to receiving signals or other inputs from the processor(s) 110 and/or the autonomous driving module(s) 160. For instance, the one or more actuators 150 can include motors, pneumatic actuators, hydraulic pistons, relays, solenoids, and/or piezoelectric actuators, just to name a few possibilities.

The vehicle 100 can include one or more modules, at least some of which are described herein. The modules can be implemented as computer-readable program code that, when executed by a processor 110, implement one or more of the various processes described herein. One or more of the modules can be a component of the processor(s) 110, or one or more of the modules can be executed on and/or distributed among other processing systems to which the processor(s) 110 is operatively connected. The modules can include instructions (e.g., program logic) executable by one or more processor(s) 110. Alternatively, or in addition, one or more data store 115 may contain such instructions.

In one or more arrangements, one or more of the modules described herein can include artificial intelligence elements, e.g., neural network, fuzzy logic or other machine learning algorithms. Further, in one or more arrangements, one or more of the modules can be distributed among a plurality of the modules described herein. In one or more arrangements, two or more of the modules described herein can be combined into a single module.

The vehicle 100 can include one or more autonomous driving modules 160. The autonomous driving module(s) 160 can be configured to receive data from the sensor system 120 and/or any other type of system capable of capturing information relating to the vehicle 100 and/or the external environment of the vehicle 100. In one or more arrangements, the autonomous driving module(s) 160 can use such data to generate one or more driving scene models. The autonomous driving module(s) 160 can determine position and velocity of the vehicle 100. The autonomous driving module(s) 160 can determine the location of obstacles, obstacles, or other environmental features including traffic signs, trees, shrubs, neighboring vehicles, pedestrians, etc.

The autonomous driving module(s) 160 can be configured to receive, and/or determine location information for obstacles within the external environment of the vehicle 100 for use by the processor(s) 110, and/or one or more of the modules described herein to estimate position and orientation of the vehicle 100, vehicle position in global coordinates based on signals from a plurality of satellites, or any other data and/or signals that could be used to determine the current state of the vehicle 100 or determine the position of the vehicle 100 with respect to its environment for use in either creating a map or determining the position of the vehicle 100 in respect to map data.

The autonomous driving module(s) 160 either independently or in combination with the isolation system 170 can be configured to determine travel path(s), current autonomous driving maneuvers for the vehicle 100, future autonomous driving maneuvers and/or modifications to current autonomous driving maneuvers based on data acquired by the sensor system 120, driving scene models, and/or data from any other suitable source such as determinations from the sensor data 250. "Driving maneuver" means one or more actions that affect the movement of a vehicle. Examples of driving maneuvers include: accelerating, decelerating, braking, turning, moving in a lateral direction of the vehicle 100, changing travel lanes, merging into a travel lane, and/or reversing, just to name a few possibilities. The autonomous driving module(s) 160 can be configured to implement determined driving maneuvers. The autonomous driving module(s) 160 can cause, directly or indirectly, such autonomous driving maneuvers to be implemented. As used herein, "cause" or "causing" means to make, command, instruct, and/or enable an event or action to occur or at least be in a state where such event or action may occur, either in a direct or indirect manner. The autonomous driving module(s) 160 can be configured to execute various vehicle functions and/or to transmit data to, receive data from, interact with, and/or control the vehicle 100 or one or more systems thereof (e.g., one or more of vehicle systems 140).

Detailed embodiments are disclosed herein. However, it is to be understood that the disclosed embodiments are intended as examples. Therefore, specific structural and functional details disclosed herein are not to be interpreted as limiting, but merely as a basis for the claims and as a representative basis for teaching one skilled in the art to variously employ the aspects herein in virtually any appropriately detailed structure. Further, the terms and phrases used herein are not intended to be limiting but rather to provide an understandable description of possible implementations. Various embodiments are shown in FIGS. 1-5, but the embodiments are not limited to the illustrated structure or application.

The flowcharts and block diagrams in the figures illustrate the architecture, functionality, and operation of possible implementations of systems, methods, and computer program products according to various embodiments. In this regard, a block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved.

The systems, components and/or processes described above can be realized in hardware or a combination of hardware and software and can be realized in a centralized fashion in one processing system or in a distributed fashion where different elements are spread across several interconnected processing systems. Any kind of processing system or another apparatus adapted for carrying out the methods described herein is suited. A typical combination of hardware and software can be a processing system with computer-usable program code that, when being loaded and executed, controls the processing system such that it carries out the methods described herein. The systems, components and/or processes also can be embedded in a computer-readable storage, such as a computer program product or other data programs storage device, readable by a machine, tangibly embodying a program of instructions executable by the machine to perform methods and processes described herein. These elements also can be embedded in an application product which comprises the features enabling the implementation of the methods described herein and, which when loaded in a processing system, is able to carry out these methods.

Furthermore, arrangements described herein may take the form of a computer program product embodied in one or more computer-readable media having computer-readable program code embodied, e.g., stored, thereon. Any combination of one or more computer-readable media may be utilized. The computer-readable medium may be a computer-readable signal medium or a computer-readable storage medium. The phrase "computer-readable storage medium" means a non-transitory storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: a portable computer diskette, a hard disk drive (HDD), a solid-state drive (SSD), a ROM, an EPROM or flash memory, a portable compact disc read-only memory (CD-ROM), a digital versatile disc (DVD), an optical storage device, a magnetic storage device, or any suitable combination of the foregoing. In the context of this document, a computer-readable storage medium may be any tangible medium that can contain, or store a program for use by or in connection with an instruction execution system, apparatus, or device.

Generally, modules as used herein include routines, programs, objects, components, data structures, and so on that perform particular tasks or implement particular data types. In further aspects, a memory generally stores the noted modules. The memory associated with a module may be a buffer or cache embedded within a processor, a RAM, a ROM, a flash memory, or another suitable electronic storage medium. In still further aspects, a module as envisioned by the present disclosure is implemented as an ASIC, a hardware component of a system on a chip (SoC), as a programmable logic array (PLA), or as another suitable hardware component that is embedded with a defined configuration set (e.g., instructions) for performing the disclosed functions.

Program code embodied on a computer-readable medium may be transmitted using any appropriate medium, including but not limited to wireless, wireline, optical fiber, cable, radio frequency (RF), etc., or any suitable combination of the foregoing. Computer program code for carrying out operations for aspects of the present arrangements may be written in any combination of one or more programming languages, including an object-oriented programming language such as Java™, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The phrase "at least one of . . . and . . . " as used herein refers to and encompasses any and possible combinations of one or more of the associated listed items. As an example, the phrase "at least one of A, B, and C" includes A, B, C, or any combination thereof (e.g., AB, AC, BC or ABC).

Aspects herein can be embodied in other forms without departing from the spirit or essential attributes thereof. Accordingly, reference should be made to the following claims, rather than to the foregoing specification, as indicating the scope hereof.

What is claimed is:

1. A system, comprising:
a memory communicably coupled to a processor and storing:
an isolation module including instructions that when executed by the processor cause the processor to:
isolate airflow to an occupant by actuation of a partition in response to a signal indicating a risk and the partition utilizes an inflatable bladder to seal an area of a compartment in a vehicle; and
a communication module including instructions that when executed by the processor cause the processor to:
communicate a precaution associated with the actuation to occupants.

2. The system of claim 1, wherein the isolation module includes instructions to isolate the airflow further including instructions to inflate the inflatable bladder to seal a space between an uppermost section of the partition and a ceiling of the vehicle.

3. The system of claim 1, wherein the isolation module further includes instructions to assess if the risk satisfies criteria according to sensor data associated with any one of vitals, mood, and proximate air quality associated with the occupant.

4. The system of claim 3, wherein the criteria includes travel of the occupant through a location with a biological hazard according to information received from a server.

5. The system of claim 1, wherein the isolation module further includes instructions to detect a virus by comparison of the risk to a known dataset associated with the occupant and features of the virus.

6. The system of claim 1, wherein the isolation module further includes instructions to update a profile of the occupant for a subsequent assessment.

7. The system of claim 1, wherein the isolation module further includes instructions to deflate the inflatable bladder to store the partition in the vehicle when the risk does not satisfy criteria.

8. The system of claim 1, wherein the isolation module further includes instructions to retract the partition per section and position in association with a location of a chamber.

9. A partition for a vehicle comprising:
an inflatable bladder to seal an area of a compartment in the vehicle in response to a signal received by a controller; and
a bottom-most section with a gasket of the partition to seal a floor of the vehicle.

10. The partition of claim 9, wherein the inflatable bladder seals a space between an uppermost section of the partition and a ceiling of the vehicle.

11. The partition of claim 9, wherein the gasket seals a slot on the floor for egress of the bottom-most section.

12. The partition of claim 11, further comprising collapsible sections to retract the partition per section through the slot.

13. A method, comprising:
isolating airflow to an occupant by actuation of a partition in response to a signal indicating a risk and the partition utilizes an inflatable bladder to seal an area of a compartment in a vehicle; and
communicating a precaution associated with the actuation to occupants.

14. The method of claim 13, wherein isolating the airflow further comprises inflating the inflatable bladder to seal a space between an uppermost section of the partition and a ceiling of the vehicle.

15. The method of claim 13, further comprising:
assessing if the risk satisfies criteria according to sensor data associated with any one of vitals, mood, and proximate air quality associated with the occupant.

16. The method of claim 15, wherein the criteria includes travel of the occupant through a location with a biological hazard according to information received from a server.

17. The method of claim 13, further comprising:
detecting a virus by comparing the risk to a known dataset associated with the occupant and features of the virus.

18. The method of claim 13, further comprising:
updating a profile of the occupant for a subsequent assessment.

19. The method of claim 13, further comprising:
deflating the inflatable bladder to store the partition in the vehicle when a risk does not satisfy criteria.

20. The method of claim 13, further comprising:
retracting the partition per section and position in association with a location of a chamber.

* * * * *